US011876686B2

(12) United States Patent
Soosahabi et al.

(10) Patent No.: US 11,876,686 B2
(45) Date of Patent: Jan. 16, 2024

(54) METHODS, SYSTEMS, AND COMPUTER READABLE MEDIA FOR CONDUCTING A NETWORK TRAFFIC SIMULATION USING HYPERTEXT TRANSFER PROTOCOL ARCHIVE DATA

(71) Applicant: Keysight Technologies, Inc., Santa Rosa, CA (US)

(72) Inventors: Reza Soosahabi, Austin, TX (US); Rakesh Seal, Bardhaman (IN); Lalithya Divi, Indiranagar (IN); Anubhab Sahu, Paschim Medinipur (IN)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 0 days.

(21) Appl. No.: 18/094,211

(22) Filed: Jan. 6, 2023

(65) Prior Publication Data
US 2023/0318929 A1  Oct. 5, 2023

Related U.S. Application Data

(60) Provisional application No. 63/326,247, filed on Mar. 31, 2022.

(51) Int. Cl.
*H04L 41/14* (2022.01)
*H04L 67/02* (2022.01)
(Continued)

(52) U.S. Cl.
CPC ........ *H04L 41/145* (2013.01); *G06F 11/3664* (2013.01); *G06F 11/3684* (2013.01);
(Continued)

(58) Field of Classification Search
None
See application file for complete search history.

(56) References Cited

U.S. PATENT DOCUMENTS 8,799,714 B1 *  8/2014  Guruswamy ....... G06F 11/3684
714/25
8,904,346 B1 *  12/2014  Strikhalev ........... G06F 11/3688
717/114

(Continued)

FOREIGN PATENT DOCUMENTS

CN  111198809 A  5/2020

OTHER PUBLICATIONS

Grafana Labs "HAR Converter" downloaded Dec. 13, 2021 from https://k6.io/docs/test-authoring/recording-a-session/har-converter/.

(Continued)

*Primary Examiner* — Lashonda Jacobs-Burton

(57) ABSTRACT

Methods, systems, and computer readable media for conducting a network traffic simulation using hypertext transfer protocol (HTTP) archive (HAR) data are disclosed. One method includes receiving HAR file information generated by a web client entity in a test environment, utilizing at least a portion of the HAR file information to generate one or more HTTP transaction test definitions, and utilizing the one or more HTTP transaction test definitions to generate an associated web application server emulation used for performing a test on a system under test (SUT). The method further includes utilizing the web application server emulation to generate a plurality of test packets and generating associated performance metric data representative of the SUT in response to the SUT processing the plurality of test packets.

20 Claims, 9 Drawing Sheets

(51) Int. Cl.
*G06F 40/14* (2020.01)
*G06F 40/205* (2020.01)
*H04L 43/08* (2022.01)
*H04L 9/40* (2022.01)
*G06F 11/36* (2006.01)

(52) U.S. Cl.
CPC .......... *G06F 11/3688* (2013.01); *G06F 40/14* (2020.01); *G06F 40/205* (2020.01); *H04L 43/08* (2013.01); *H04L 63/1408* (2013.01); *H04L 67/02* (2013.01)

(56) References Cited

U.S. PATENT DOCUMENTS

| | | | | |
|---|---|---|---|---|
| 9,292,397 | B1* | 3/2016 | Kleyman | G06F 11/2221 |
| 9,912,753 | B2* | 3/2018 | Blahaerath | H04L 67/562 |
| 9,978,084 | B1* | 5/2018 | Sharma | G06F 11/3688 |
| 10,204,035 | B1 | 2/2019 | Surace et al. | |
| 10,282,282 | B2* | 5/2019 | Shavro | G06F 11/3692 |
| 11,093,376 | B2* | 8/2021 | Sommers | G06F 11/3688 |
| 11,716,275 | B1* | 8/2023 | Varadharaj Singaravelu | H04L 43/00 370/252 |
| 2016/0364307 | A1* | 12/2016 | Garg | G06F 11/2273 |
| 2017/0180233 | A1* | 6/2017 | Nistor | H04L 43/12 |
| 2019/0182129 | A1 | 6/2019 | Canady et al. | |
| 2019/0324897 | A1 | 10/2019 | Subramanian et al. | |
| 2022/0334937 | A1* | 10/2022 | Jardini | G06F 11/3688 |
| 2022/0334959 | A1* | 10/2022 | Wang | G06F 40/205 |

OTHER PUBLICATIONS

HTTP Runner "Record & Generate Testcase" downloaded Dec. 13, 2021 from https://docs.httprunner.org/user/gen_tests/.

Koopmans, Tim "Convert HAR Files to JMeter Test Plans" (May 29, 2015) downloaded Dec. 13, 2021 from https://www.flood.io/blog/convert-har-files-to-jmeter-test-plans.

Microsoft Azure Test Plans "Record and replay cloud-based load tests," dated Dec. 7, 2018 downloaded from https://learn.microsoft.com.

StormForger Documentation "Convert Browser Session from HAR" downloaded Dec. 13, 2021 from https://docs.stormforger.com/guides/har-converter/.

Testim "Mocking Network Traffic Using a HAR File" downloaded Dec. 13, 2021 from https://help.testim.io/docs/mocking-all-the-network-traffic-using-a-har-file.

* cited by examiner

METHODS, SYSTEMS, AND COMPUTER READABLE MEDIA FOR CONDUCTING A NETWORK TRAFFIC SIMULATION USING HYPERTEXT TRANSFER PROTOCOL ARCHIVE DATA

PRIORITY CLAIM

This application claims the priority benefit of U.S. Provisional Patent Application Ser. No. 63/326,247, filed Mar. 31, 2022, the disclosure of which is incorporated herein by reference in its entirety.

TECHNICAL FIELD

The subject matter described herein relates to network testing. More specifically, the subject matter relates to methods, systems, and computer readable media for conducting a network traffic simulation utilizing hypertext transfer protocol (HTTP) archive (HAR) data.

SUMMARY

Methods, systems, and computer readable media for conducting a network traffic simulation using hypertext transfer protocol (HTTP) archive (HAR) data are disclosed. One method includes receiving HAR file information generated by a web client entity in a test environment, utilizing at least a portion of the HAR file information to generate an HTTP transaction test definition, and utilizing the HTTP transaction test definition to generate an associated web application server emulation used for performing a test on a system under test (SUT). The method further includes utilizing the web application server emulation to generate a plurality of test packets and generating associated performance metric data representative of the SUT in response to the SUT processing the plurality of test packets.

According to another aspect of the method described herein, the SUT includes a device under test (DUT).

According to another aspect of the method described herein, the web client entity generates the HAR file information in response to an HTTP based transaction conducted with one or more web service production servers.

According to another aspect of the method described herein, the HAR parsing and processing engine is configured to analyze the HAR file information, identify one or more entropy insertion points in the HAR file information, and insert random parameter values at the identified one or more entropy insertion points to produce entropy enriched HAR file information.

According to another aspect of the method described herein, the test case execution engine is configured to use the entropy enriched HAR file information to generate the one or more HTTP transaction test definitions for generating synthetic test traffic that is similar to the HTTP traffic represented in the HAR file information.

According to another aspect of the method described herein, the test system includes a transmit port for transmitting simulated test packet traffic towards the SUT and a receive port for receiving the simulated packet traffic that transits the SUT.

According to another aspect of the method described herein, an automated web client exerciser engine configured to automatically exercise the web client entity.

According to another aspect of the disclosed subject matter described herein, a test system for conducting a network traffic simulation using hypertext transfer protocol archive data is disclosed. For example, the system includes a HAR parsing and processing engine configured for analyzing HAR file information generated by a web client entity and utilizing at least a portion of the HAR file information to generate one or more HTTP transaction test definitions. The system further includes a test case execution engine configured for utilizing the one or more HTTP transaction test definitions to generate a web application server emulation used to perform a test on a system under test (SUT) and executing the web application server emulation to generate a plurality of test packets. The test system further includes a performance analysis and reporting module for generating a performance metric for the SUT in response to the SUT processing the plurality of test packets.

According to another aspect of the test system described herein, SUT includes a device under test (DUT).

According to another aspect of the test system described herein, the SUT includes a device under test (DUT).

According to another aspect of the test system described herein, the web client entity generates the HAR file information in response to an HTTP based transaction conducted with one or more web service production servers.

According to another aspect of the test system described herein, the HAR parsing and processing engine is configured to analyze the HAR file information, identify one or more entropy insertion points in the HAR file information, and insert random parameter values at the identified one or more entropy insertion points to produce entropy enriched HAR file information.

According to another aspect of the test system described herein, the test case execution engine is configured to use the entropy enriched HAR file information to generate the one or more HTTP transaction test definitions for generating synthetic test traffic that is similar to the HTTP traffic represented in the HAR file information.

According to another aspect of the test system described herein, the test system includes a transmit port for transmitting simulated test packet traffic towards the SUT and a receive port for receiving the simulated packet traffic that transits the SUT.

According to another aspect of the test system described herein, an automated web client exerciser engine configured to automatically exercise the web client entity.

The subject matter described herein may be implemented in software in combination with hardware and/or firmware. For example, the subject matter described herein may be implemented in software executed by a processor. In one example implementation, the subject matter described herein may be implemented using a non-transitory computer readable medium having stored therein computer executable instructions that when executed by the processor of a computer control the computer to perform steps. Example computer readable media suitable for implementing the subject matter described herein include non-transitory devices, such as disk memory devices, chip memory devices, programmable logic devices, field-programmable gate arrays, and application specific integrated circuits. In addition, a computer readable medium that implements the subject matter described herein may be located on a single device or computer platform or may be distributed across multiple devices or computer platforms.

As used herein, the term 'node' refers to a physical computer platform including one or more processors, network interfaces, and memory.

As used herein, each of the terms 'function', 'engine', and 'module' refers to hardware, which may also include software and/or firmware, for implementing the feature(s) being described.

BRIEF DESCRIPTION OF THE DRAWINGS

The subject matter described herein will now be explained with reference to the accompanying drawings of which.

DETAILED DESCRIPTION

This document describes methods, systems, and computer readable media for conducting a network traffic simulation utilizing hypertext transfer protocol archive data. In some embodiments, the disclosed subject matter includes an HTTP Archive (HAR) file driven test system capable of performing 2-arm tests (e.g., emulating bi-directional traffic communicated between both a client entity and a server entity during the testing of a system under test (SUT) or device under test (DUT). Notably, the test system can generate web server emulations that are derived from analysis of the HAR file information. For example, the HAR driven test system may be configured to estimate payload parameter values. this is required in order to emulate realistic bi-directional test packet traffic required for a 2-arm test session. In some embodiments, the HAR driven test system may be adapted to identify entropy insertion points in the HAR file information and add random and/or pseudorandom parameter values at the identified points.

Figure 1:
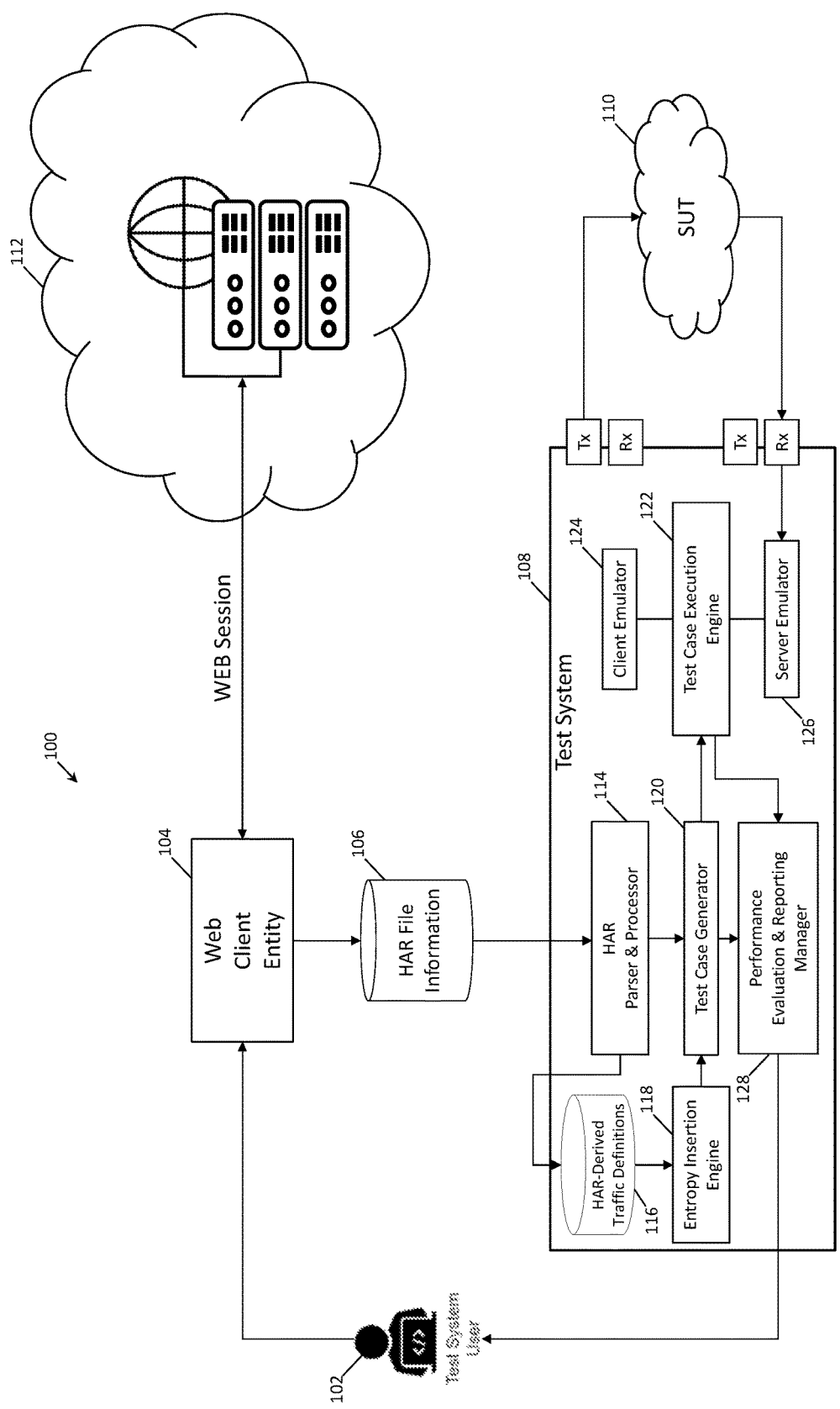
FIG. 1 is a block diagram illustrating an example test system configured for generating test simulation packet traffic using HAR information.

FIG. 1 depicts an example test system environment 100 that includes a test system user entity 102, a web client entity 104, a test system 108, a system under test (SUT) 110 (or device under test), and a production network 112. In some embodiments, test system user entity 102 (e.g., a test administrator or automated test facilitation program) launches a stand-alone web client entity 104 (e.g., a web browser) on an external computing platform. The external computing platform may include a personal computer, a laptop, or other similar computing device. As test system user entity 102 is utilizing web client entity 104, the user initiated web activities involve communications between the web client and one or more web service servers in production network 112. Notably, these web session communications can be facilitated via HTTP transactions and/or HTTPS transactions. For example, test system user entity 102 may manually (or in an automated manner) conduct or perform one or more web based activities, such as browsing a web site hosted at a web server, accessing a web service hosted at a web server, or the like. In such embodiments, the stand-alone web client entity 104 (e.g., a Chrome browser, Edge browser, Firefox browser, etc.) utilized by test system user entity 102 is adapted to establish session connections and communicate with one or more production and/or live web servers. More specifically, web client entity 104 (e.g., a web client application, a web client emulation, web client instance, etc.) is configured to establish web sessions with one or more production and/or live web servers in production network 112. Further, web client entity 104 may be a HAR-capable web client entity that is adapted to generate and store HAR file information 106 associated with the HTTP transactions (e.g., web sessions) conducted between web client entity 104 and the servers in production network 112. For example, the web client entity 104 can be configured to enable and/or perform HAR recording via its browser application/functionality. Web client entity 104 is further configured to provide the collected/stored HAR file information 106 to test system 108. In some embodiments, the collected HAR file information may comprise log data representative of web browsing activity that is recorded by the web client entity. For example, the HAR file information can contain request data, response data, form data, image data, and any other web element data that can be viewed or accessed by a web browser entity. In some embodiments, the collected HAR file information may comprise a HAR file stored local on a user computer (i.e., the computer hosting web client entity 104) and is subsequently uploaded to test system 108 for the creation of simulations. For example, the web client entity 104 may upload the stored HAR file to test system 108 on a periodic basis predefined by the operator (e.g., once every hour, day, etc.). In some embodiments, the web client entity 104 includes a web crawler application or functionality (e.g., an automated Internet browsing function) that can be minimally configured by a system operator (e.g., target website addresses and account logins provided). After such configuration, the web client entity 104 (via its web crawler application) can automatically interact with the indicated websites and subsequently records the HAR file an uploads it to test system 108.

Alternatively, the stored HAR file can be uploaded to test system 108 in response to an operator's request (e.g., on-demand command). In such an embodiment, the system operator can browse the Internet using a web browser (of web client entity 104) and the associated activity is collected in a HAR file. The system operator can then manually instruct web client entity 104 to upload the HAR file information to test system 108 for running a test simulation.

After the web client entity 104 generates and stores the HAR file information 106, the HAR file information 106 is provided to and/or accessed by a HAR parsing and processing engine 114 located in test system 108. Notably, HAR parsing and processing engine 114 is configured to read, parse, and process the HAR file information 106 that is generated and stored by web client entity 104. The processed HAR file information 106 is used, at least in part, to subsequently generate test packet traffic associated with a test case for testing a device (DUT) or system under test (SUT) 110. Examples of a DUT and/or SUT 110 include, but are not limited to, a firewall, an intrusion detection system (IDS), a data leakage protection (DLP) system, and an intrusion protection system (IPS), Web Application Firewall (WAF), and the like. In some embodiments, HAR parsing and processing engine 114 utilizes HAR file information to process HAR derived traffic definitions 116, such as HTTP transaction data definitions.

In some embodiments, HAR parsing and processing engine 114 is further adapted to analyze the collected HAR file information 106 associated with a recorded HTTP transaction(s) and identify one or more entropy insertion points to extrapolate multiple-user scenario from a single-user capture (as described in greater detail below). Namely, test system 108 further includes a HAR entropy insertion engine 118 that is configured to use a pre-trained pattern recognition model on HTML content. For example, HAR entropy insertion engine 118 may utilize a pattern recognition model to recognize the username, password, and other randomizable strings included in the HAR file information input. In some embodiments, HAR entropy insertion engine 118 may be further configured to perform auto-correlation-aware randomization of those fields during an associated test run. As such, test system 108 is able to maintain persistent randomized values across an entire array of HTTP transactions.

After processing the HAR information, HAR entropy insertion engine 118 may forward the resulting entropy enriched HAR file information to a test case generator 120. In some embodiments, test case generator 120 is a software based algorithm configured to generate simulated network traffic test cases for SUTs and/or DUTs. For example, test case generator 120 is configured to process entropy enriched HAR data to generate test traffic definition information and/or instructions associated with a test case that can be used to generate an associated web application server emulation.

In other embodiments, HAR parsing and processing engine 114 may process the HAR file information without the use of entropy insertion engine 118. Namely, HAR parsing and processing engine 114 is configured to provide HTTP transaction test definition information to test case generator 120 directly. For example, HAR parsing and processing engine 114 may identify one or more parameters included in the recorded transaction messages (i.e., HAR file information 106) whose values can be randomized upon playback to test various performance aspects of a DUT and/or SUT. In some embodiments, HAR parsing and processing engine 114 provides this information as definition information to a test case generator 120 (e.g., either directly or via an entropy insertion engine 118) within test system 108. Notably, test case generator 120 may be adapted to create web application server emulations that are based (at least in part) on the HAR file information 106 and associated entropy insertion point metadata (e.g., produced by entropy insertion engine 118).

In some embodiments, since the HAR file information 106 only contains the application layer traffic, test case generator 120 estimates the session layer (TLS) parameters to be used in the test emulation based on the HTTP host attributes and external database of certified web servers. Notably, test case generator 120 is able to simulate packet traffic related to the application layer, network layer, and transport layer. In some embodiments, test system 108 includes a full-stack network traffic simulator with a traffic engine (e.g., test case execution engine 122) that requires TCP/UDP (L4) packet payloads with session layer parameters as input. However, these session layer parameters are not recorded in HAR files by web client entity 104. Notably, one function of the session layer (L5) is to provide security measures that convert HTTP packets (both version 1.1 and version 2) to HTTPS packets, which is essentially HTTP using TLS as a session layer. Similar concepts apply to HTTP3, which uses a QUIC session layer that shares many TLS functions and parameters.

In some embodiments, the most important TLS parameters required in a traffic simulation include the Server Name Identification (SNI) and the X.509 Server Certificate (which includes signatures and common name (CN)). In particular, a correlation pattern existing between the HTTP Host header and URI path has been identified and utilized by the disclosed subject matter. All of the HTTP parameters in the HAR file can be applied to a predefined set of rules that enables test system 108 to determine and/or formulate the SNI and CN from the HTTP host header and URI. As for the server certificate, test system 108 can utilize the same server certificate for each of the hosts identified in the HAR file information.

In some alternate embodiments, test system 108 may be provided Internet access that can be used by test system 108 to access the application servers/hosts identified in the HAR file. More specifically, test system 108 can be configured to automatically access the hosts (i.e., hosts identified by information extracted from the input HAR file) during a test session. Test system 108 may be further configured to synthesize and/or forge a unique certificate (for each host) that mimics the certificate the host uses for Internet communications.

Test case generator 120 is further configured to provide the web application server emulation data created from test case definitions to test case execution engine 122. In particular, test case execution engine 122 is adapted to execute test instructions (i.e., web application server emulation data) associated with a test case and facilitate/orchestrate the execution of the test being applied to DUT/SUT 110. In some embodiments, test case execution engine 122 is configured to execute the test case received by test case generator 120. For example, test case execution engine 122 may utilize the HAR-derived test traffic specification information (corresponding to the test case) to generate associated test packet traffic (e.g., test packet payloads for test system 108) by a traffic generator engine (not shown) within test system 108. After being generated, the test packet traffic is forwarded to a client emulator 124. The client emulator 124 is configured to transmit the test traffic to a SUT 110 (or DUT) via a test system transmission (Tx) port. In some embodiments, a transmission port processor utilized by client emulator 124 is associated with a particular Web client emulation instance (i.e., that is created by client emulator 124).

After the test traffic has been received and processed by DUT 110, the test traffic is subsequently received by a receive port processor associated with a test system receiving (Rx) port. In one embodiment, the receiving port processor is associated with the Web server emulation instance (e.g., that is created by server emulator module 126).

In a two-arm test environment as shown in FIG. 1, test case execution engine 122 is adapted to receive and analyze test traffic that has transited the DUT/SUT 110. Upon being received by test case execution engine 122, the received test traffic is forwarded to a performance evaluation and reporting manager 128 (via test case execution engine 122). In some embodiments, performance analysis and reporting manager 128 can analyze the transmitted and received test traffic. Specifically, the test traffic is analyzed by performance evaluation and reporting manager 128, which subsequently generates one or more performance metrics (e.g., performance metric data) associated with DUT 110 (or SUT). After generating the performance metrics, performance evaluation and reporting manager 128 is configured to log and report the performance metrics to the test system user entity 102. For example, the performance metric data may be accessed by and/or presented to the test system user entity 102 via screen display.

Figure 2:
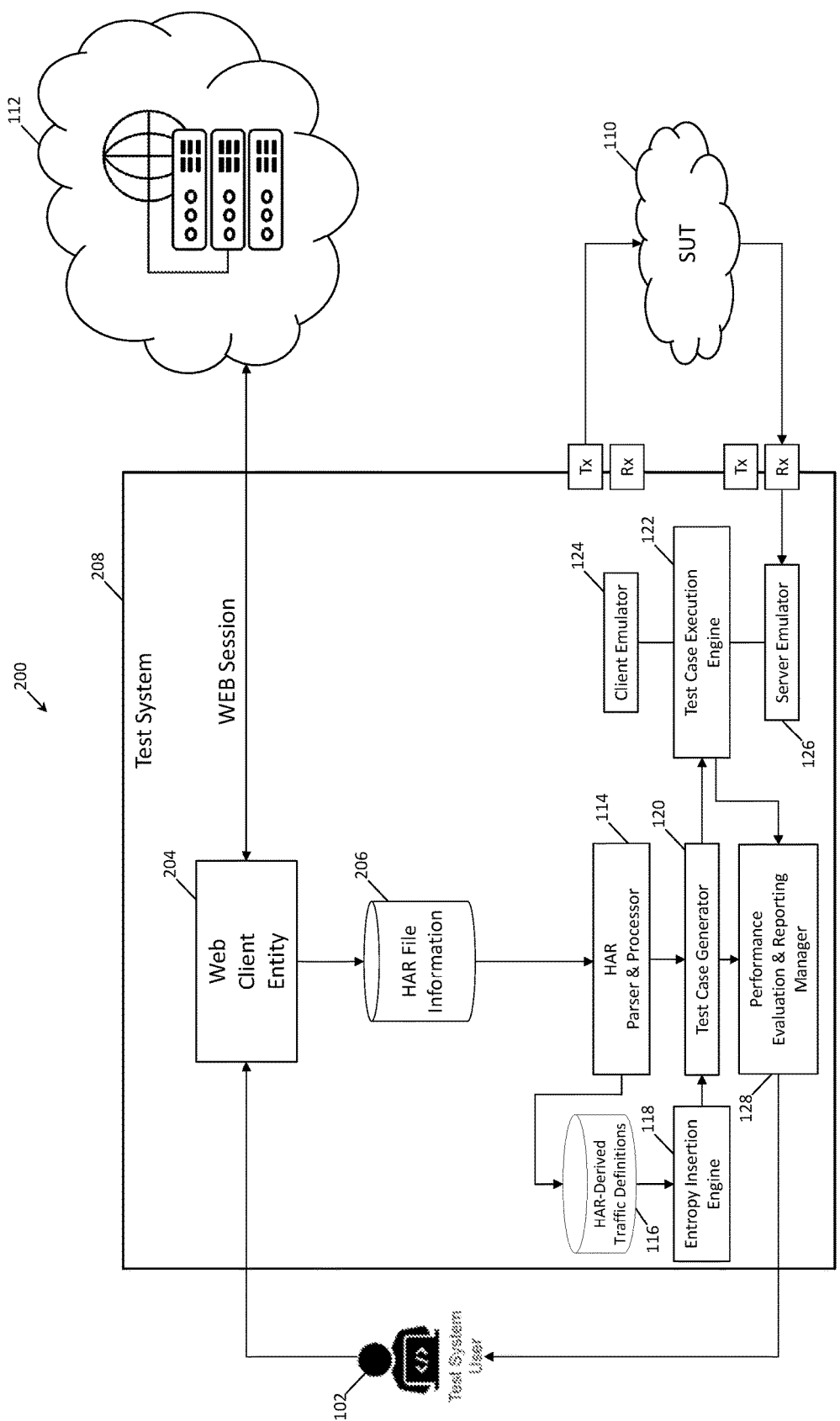
FIG. 2 is a block diagram illustrating an example test system configured for generating test simulation packet traffic using HAR information and an integrated web client entity.

Although FIG. 1 depicts web client instance and HAR files (e.g., HAR file information 106) being positioned externally to test system 108, one or more of these elements may be included in the test system without departing from the scope of the disclosed subject matter. For example, FIG. 2 depicts a test environment 200 comprising a test system 208 that may include and/or incorporate web client entity 204 (e.g., web client application, web client emulation, and/or web client instance) as a part of, or integrated within, the test system. Similarly, the HAR file data 206 may be similarly included within test system 208 along with the web client entity 204. Despite the changes indicated in test environment 200, test system 208 is still able to operate in a manner very similar to test system 108 as described above with regard to FIG. 1.

Figure 3:
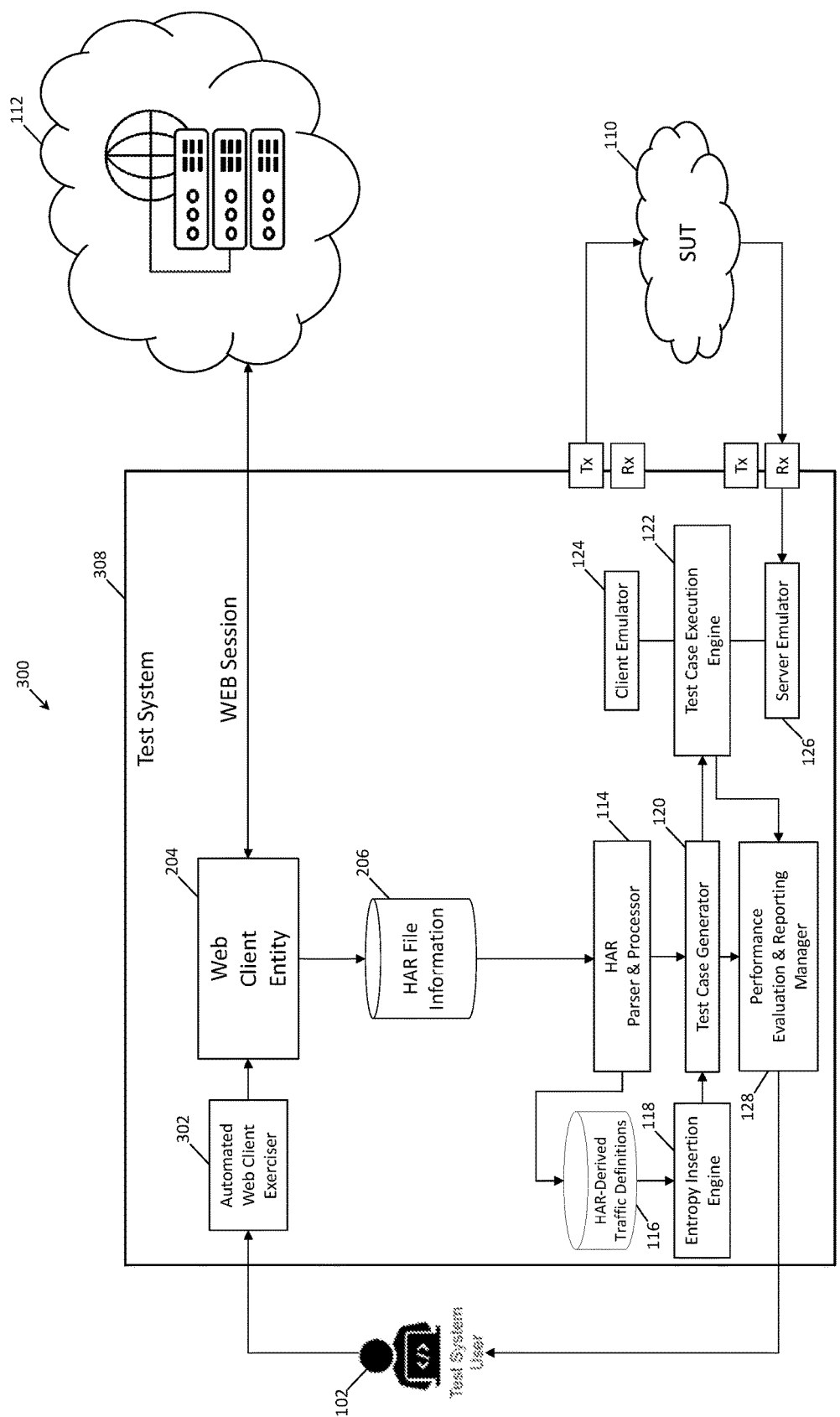
FIG. 3 is a block diagram illustrating an example test system configured for generating test simulation packet traffic using HAR information and an automated web client exerciser.

FIG. 3 is a block diagram illustrating an example test system configured for generating test packet traffic using HAR information and an automated web client exerciser. For example, test environment 300 that includes a test system 208 containing and/or incorporating web client entity 204 (e.g., web client application, web client emulation, and/or web client instance) and an automated web client exerciser 302 as parts of, or integrated within, the test system. In some embodiments, automated web client exerciser 302 may be configured to initiate a variety of web based activities in an automated manner. More specifically, automated web client exerciser 302 can be adapted to perform web client activities in pace of manual user operation. The automated web client exerciser 302 may be configured to operate with associated web client entity 204, which then generates HAR file information as described previously. Despite the changes indicated in test environment 300, test system 308 is still able to operate in a manner very similar to test systems 108-208 as described above with regard to FIGS. 1-2, respectively.

Figure 4:
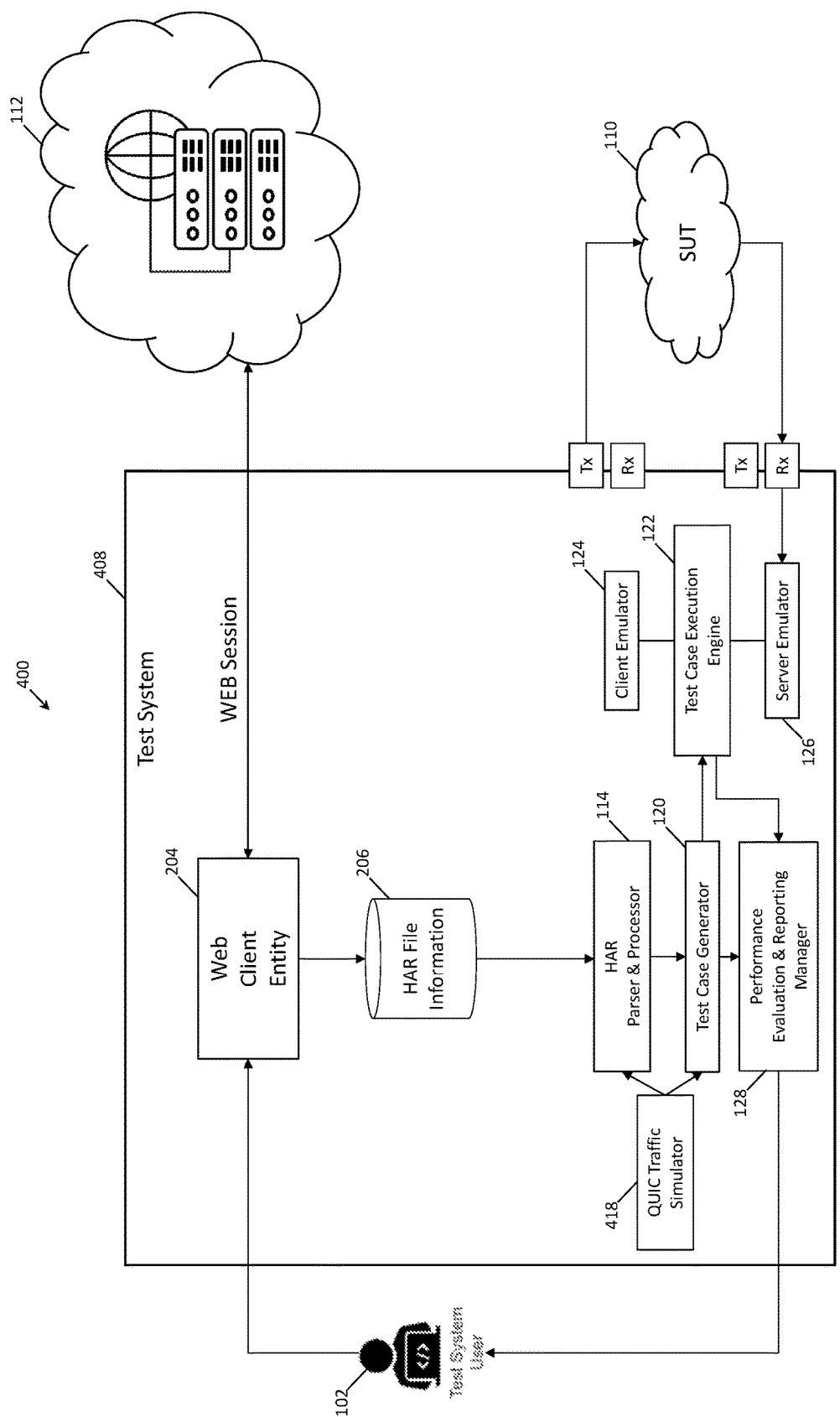
FIG. 4 is a block diagram illustrating an example test system configured for generating test simulation packet traffic using HAR information and a QUIC traffic simulator.

FIG. 4 is a block diagram illustrating an example test system configured for generating test packet traffic using HAR information and a QUIC traffic simulator. For example, test environment 400 includes a test system 408 containing and/or incorporating web client entity 204 (e.g., web client application, web client emulation, and/or web client instance) and a QUIC traffic simulator 418 (e.g., Keysight ATI QUIC Traffic simulator) as parts of, or integrated within, the test system. Notably, test system 408 is adapted to emulate HTTP3 client end points and server endpoints for the purposes of 2-arm testing SUT 110 (or a DUT). Notably, QUIC is becoming increasingly popular on a daily basis and most of the top companies (e.g., FAANGs/MAANGs) have already started utilizing QUIC for streaming multi-media content. In some embodiments, simulator 418 is configured to support a plurality of QUIC versions (such as, but not limited to, IETF QUIC draft-22,27,29, Google QUIC Q043, Q046, Q050, T051 and QUIC Facebook mvfst draft-22,27). If the captured HAR file information contains HTTP3 traffic (i.e., QUIC), HAR parser and processing engine 114 and/or QUIC traffic simulator 418 can obtain that information (e.g., QUIC versions, SNIs, HTTP3 headers, etc.) from the capture and can subsequently add the QUIC traffic during the HAR traffic simulation.

In some embodiments, the HAR file information 106 and/or 206 used as input can include many host names and their respective application traffic. However, in the practical scenario, not all of the hosts contribute a significant amount of data to the application traffic. In some embodiments, the disclosed test system applies a novel approach to sort traffic hostnames based on the traffic volume that is observed in the captured input HAR file and gives the system user an option to exclude the hostnames which does not contribute much to the real-world application traffic in terms of traffic volume (i.e., conduct an host selection intelligence functionality). Further, the disclosed test system also affords the option to simulate hosts based on the response traffic observed in the application traffic. In some embodiments, the hostnames are sorted based on the request-response time observed for each individual packet and the system user has an option to select the best performing hosts or less performing hosts to simulate degrees of packet latency.

Figure 5:
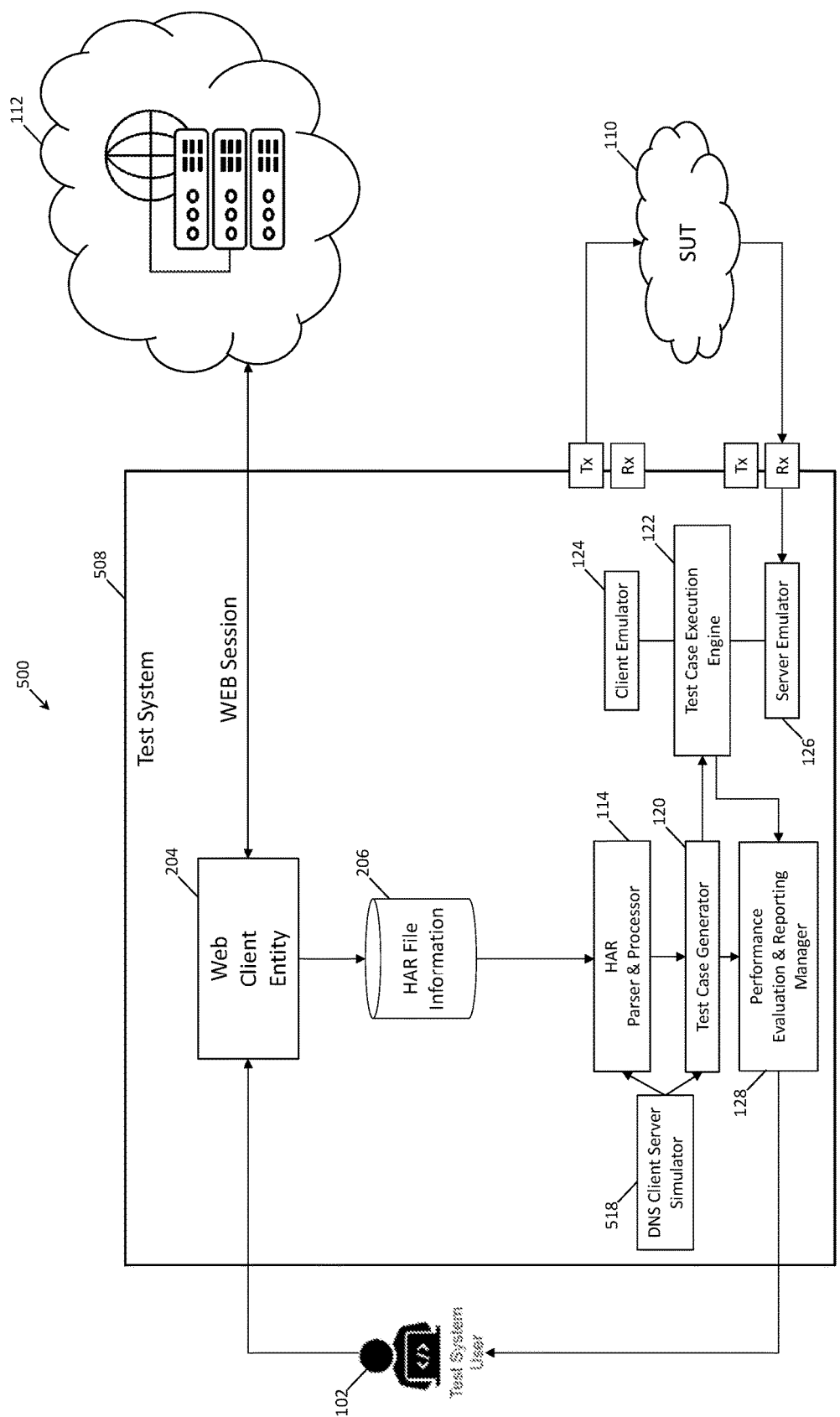
FIG. 5 is a block diagram illustrating an example test system configured for generating test simulation packet traffic using HAR information and a DNS client server simulator.

FIG. 5 is a block diagram illustrating an example test system configured for generating test packet traffic using HAR information and a DNS client server simulator. For example, test environment 500 includes a test system 508 containing and/or incorporating a DNS client server traffic simulator 518 as a part of, or integrated within, the test system. Notably, traffic simulator 518 in test system 508 can be configured to facilitate a DNS traffic insertion functionality. For example, test system 508 is adapted to additionally emulate a DNS server with which the web client-side emulation communicates during a test. This feature can support DNS Query responses in both DNS and DoT (i.e., DNS over TLS) with advanced features, such as ESNI.

Figure 6:
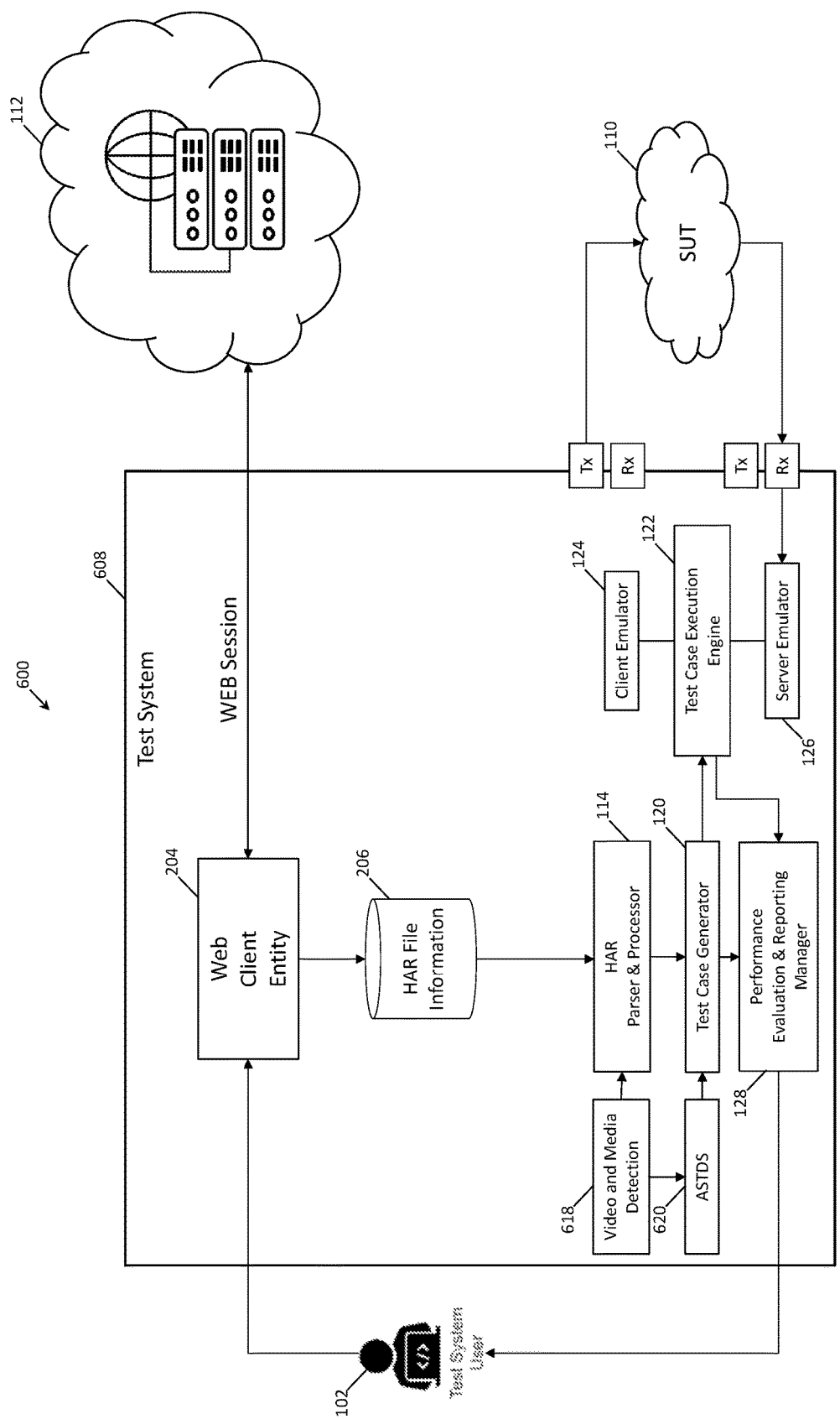
FIG. 6 is a block diagram illustrating an example test system configured for generating test simulation packet traffic using HAR information and a video and media detection engine.

FIG. 6 is a block diagram illustrating an example test system configured for generating test packet traffic using HAR information and a video and media detection engine. For example, test environment 600 includes a test system 608 containing and/or incorporating a video and media detection engine 618 and an adaptive streaming technologies detection and simulation (ASTDS) engine 620 as parts of, or integrated within, the test system. Notably, engine 618 in test system 608 can be configured to facilitate video/media detection and simulation functionalities. For example, test system 608 is adapted to additionally detect video and media traffic present in the HAR file information capture. Notably, detection engine 618 can be configured to detect adaptive streaming technologies on over HTTP, such as DASH and HLS, from the HAR captured video/media traffic and enabling system users to upload their own test media file during simulation.

Figure 7:
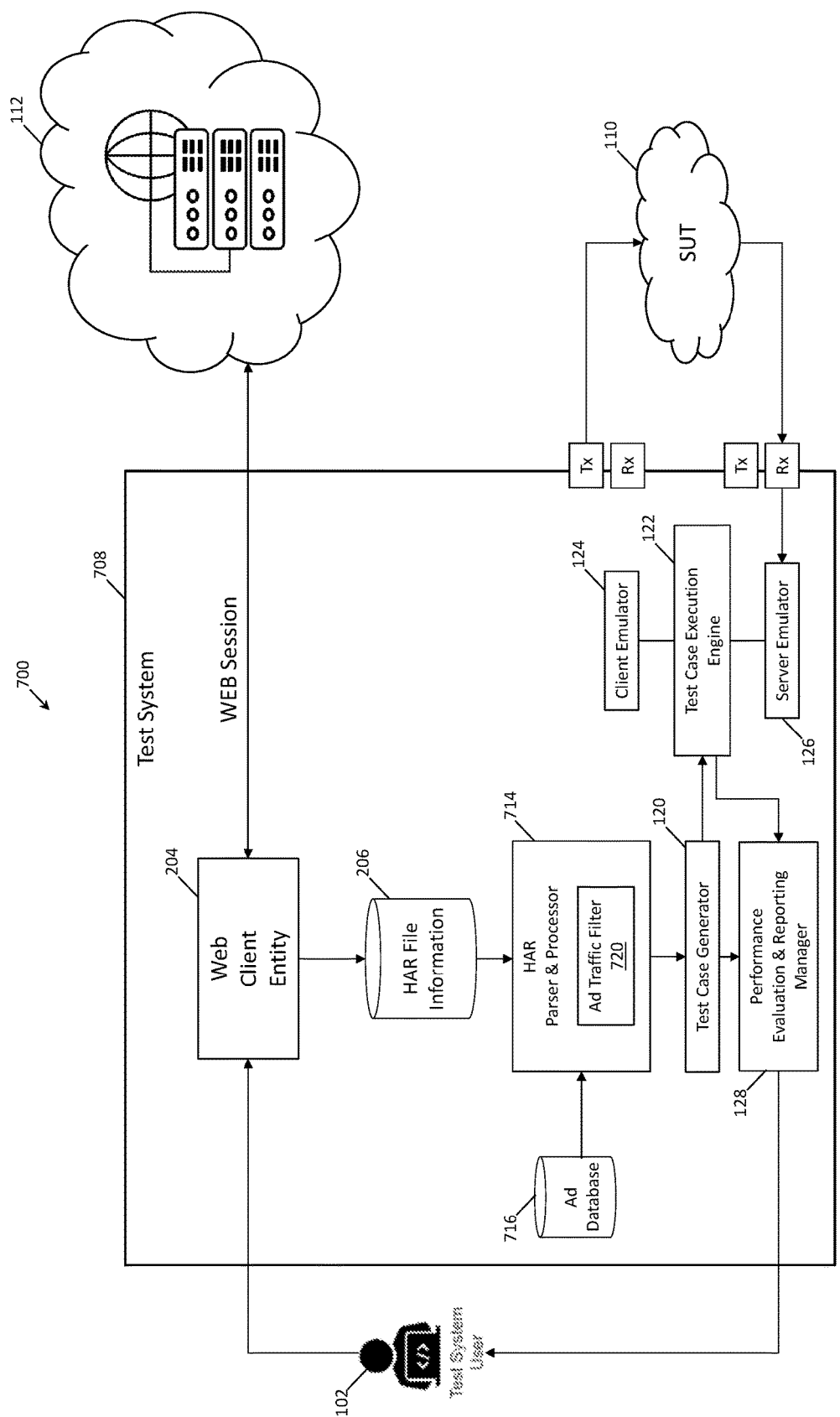
FIG. 7 is a block diagram illustrating an example test system configured for generating test simulation packet traffic using HAR information and an advertisement database.

FIG. 7 is a block diagram illustrating an example test system configured for generating test packet traffic using HAR information and advertisement database. For example, test environment 700 includes a test system 708 containing and/or incorporating an advertisement database 716 and an advertisement traffic filter 720 as a part of, or integrated within, the test system. Notably, advertisement traffic filter 720 and/or advertisement database 716 in test system 708 can be configured to assist with advertisement-based traffic simulations in test environment 700. At present, most web sites use different advertisements in their respective web pages. As such, if the advertisement traffic is present in the capture of the HAR file information, the disclosed test system provides a novel approach to filter the advertisement traffic from the original HAR information file with the assistance of advertisement database 716 (e.g., Keysight ATI Ads database). In some embodiments, advertisement traffic filter 720 in HAR parser and processor engine 714 is configured to include or exclude advertisement traffic during a traffic simulation as per the customer requirements.

Figure 8:
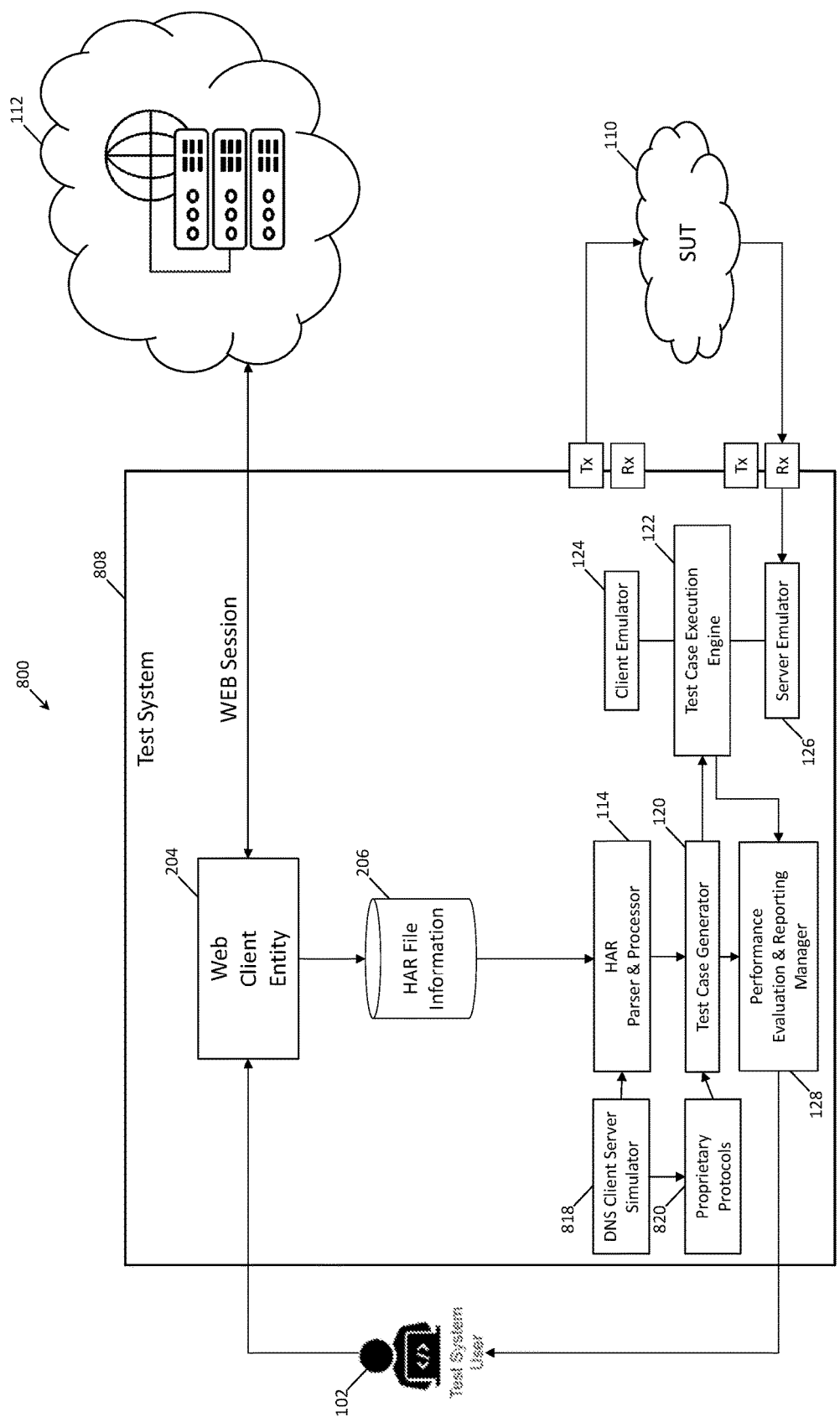
FIG. 8 is a block diagram illustrating an example test system configured for generating test simulation packet traffic using HAR information and a DNS client server simulator with proprietary protocols.

FIG. 8 is a block diagram illustrating an example test system configured for generating test packet traffic using HAR information and a DNS client server simulator with proprietary protocols. For example, test environment 800 includes a test system 808 containing and/or incorporating a DNS client server simulator 818 and proprietary protocols 820 a part of, or integrated within, the test system. At present, a majority of modern web applications are being developed and deployed with highly sophisticated multimedia content. Ideally, HAR file information would be able to record HTTP and web socket protocols, and the offering by Keysight would embed the relevant protocols needed to make the web application more comprehensive.

Figure 9:
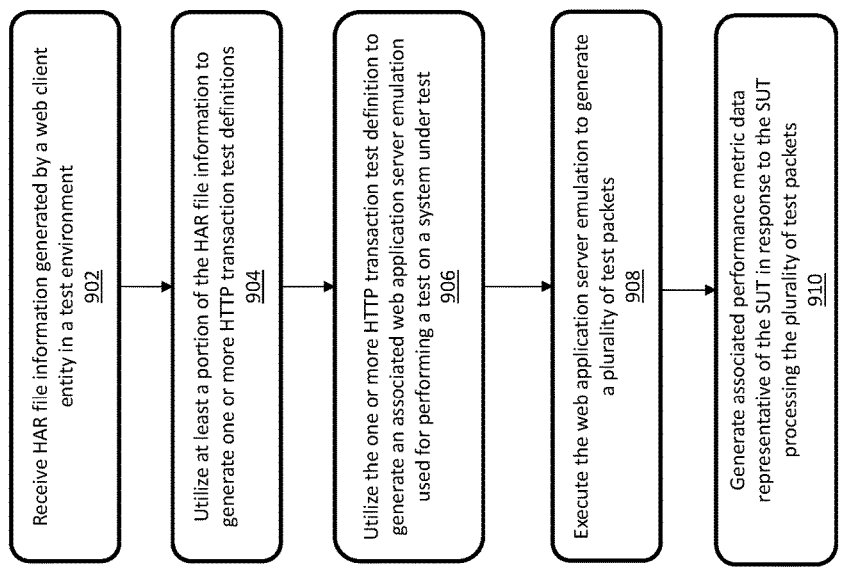
FIG. 9 is a flow diagram of an example method for conducting a network traffic simulation utilizing HAR data.

FIG. 9 is a flow diagram of an example method 900 for conducting a network traffic simulation using hypertext transfer protocol archive data in accordance with embodiments described herein. The method 900 can be performed, for example, by the HAR parsing and processing engine 114, test case generator, 120 test case execution engine 122, performance evaluation and reporting manager 128, and/or test stem 108 as shown in FIG. 1.

The method 900 includes receiving HAR file information generated by a web client entity in a test environment (see step 902 in FIG. 9). In some embodiments, a HAR parsing and processing engine is configured to receive HAR file information as input from a web client entity. Notably, the web client entity generates the HAR file information as a result of HTTP transactions conducted via web sessions established with servers in a production network.

The method 900 includes utilizing at least a portion of the HAR file information to generate one or more HTTP transaction test definitions (see step 904 in FIG. 9). For example, the HAR parsing and processing engine is configured to analyze and process the HAR file information to generate one or more HTTP transaction test definitions that are representative of network traffic that is communicated between a web client entity and a production server. In some embodiments, the HAR parsing and processing engine is further configured to utilize an entropy insertion engine scale the generated traffic to multiple users. For example, potential parameters in the HAR file information are identified as being able to be randomized.

The method 900 includes utilizing one or more HTTP transaction test definitions to generate an associated web application server emulation used for performing a test on a SUT (see step 906 in FIG. 9). In some embodiments a test case generator in the test system receives the one or more HTTP transaction test definitions and generates and associated web application server emulation.

The method 900 includes executing the web application server emulation to generate a plurality of test packets (see step 908 in FIG. 9). In some embodiments, the test case generator in the test system uses the web application server emulation to produce simulated packet traffic that is communicated between an emulated client and emulated server. Notably, the bi-directional simulated packet traffic is communicated between the emulated client and emulated server via the SUT (or DUT).

The method 900 includes generating associated performance metric data representative of the SUT in response to the SUT processing the plurality of test packets (see step 910 in FIG. 9). In some embodiments, the test case generator is configured to provide simulation test result data to a performance evaluation and reporting manager in the test system. In response to receiving and analyzing the result data, performance evaluation and reporting manager is configured to generate performance metric data pertaining the SUT's test performance. The performance evaluation and reporting manager is further configured to report the performance metric data to a test system user or administrator.

Although specific examples and features have been described above, these examples and features are not intended to limit the scope of the present disclosure, even where only a single example is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed in this specification (either explicitly or implicitly), or any generalization of features disclosed, whether or not such features or generalizations mitigate any or all of the problems described in this specification. Accordingly, new claims may be formulated during prosecution of this application (or an application claiming priority to this application) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A system for conducting a network traffic simulation using hypertext transfer protocol (HTTP) archive (HAR) data, the system comprising:
    a HAR parsing and processing engine configured for analyzing HAR file information generated by a web client entity and utilizing at least a portion of the HAR file information to generate one or more HTTP transaction test definitions;
    a test case execution engine configured for utilizing the one or more HTTP transaction test definitions to generate a web application server emulation used to perform a test on a system under test (SUT) and executing the web application server emulation to generate a plurality of test packets; and
    a performance analysis and reporting module for generating a performance metric for the SUT in response to the SUT processing the plurality of test packets.

2. The system of claim 1 wherein the SUT includes a device under test (DUT).

3. The system of claim 1 wherein the web client entity generates the HAR file information in response to an HTTP based transaction conducted with one or more web service production servers.

4. The system of claim 1 wherein the HAR parsing and processing engine is configured to analyze the HAR file information, identify one or more entropy insertion points in the HAR file information, and insert random parameter values at the identified one or more entropy insertion points to produce entropy enriched HAR file information.

5. The system of claim 4 wherein the test case execution engine is configured to use the entropy enriched HAR file information to generate the one or more HTTP transaction test definitions for generating synthetic test traffic that is similar to HTTP traffic represented in the HAR file information.

6. The system of claim 1 further including a transmit port for transmitting the plurality of test packets towards the SUT and a receive port for receiving the plurality of test packets that transits the SUT.

7. The system of claim 1 further comprising an automated web client exerciser engine configured to automatically exercise the web client entity.

8. A method for conducting a network traffic simulation using hypertext transfer protocol (HTTP) archive (HAR) data, the method comprising:
   receiving HAR file information generated by a web client entity in a test environment;
   utilizing at least a portion of the HAR file information to generate one or more HTTP transaction test definitions;
   utilizing the one or more HTTP transaction test definition to generate an associated web application server emulation used for performing a test on a system under test (SUT);
   executing the web application server emulation to generate a plurality of test packets; and
   generating associated performance metric data representative of the SUT in response to the SUT processing the plurality of test packets.

9. The method of claim 8 wherein the SUT includes a device under test (DUT).

10. The method of claim 8 wherein the web client entity generates the HAR file information in response to an HTTP based transaction conducted with one or more web service production servers.

11. The method of claim 8 comprising analyzing the HAR file information, identifying one or more entropy insertion points in the HAR file information, and inserting random parameter values at the identified one or more entropy insertion points to produce entropy enriched HAR file information.

12. The method of claim 11 wherein the entropy enriched HAR file information is used to generate the one or more HTTP transaction test definitions for generating synthetic test traffic that is similar to HTTP traffic represented in the HAR file information.

13. The method of claim 8 wherein the plurality of test packets is transmitted towards the SUT via a transmit port and received from the SUT via a receive port.

14. The method of claim 8 further comprising an automated web client exerciser engine configured to automatically exercise the web client entity.

15. A non-transitory computer readable medium comprising computer executable instructions embodied in the non-transitory computer readable medium that when executed by at least one processor of at least one computer cause the at least one computer to perform steps comprising:
   receiving hypertext transfer protocol (HTTP) archive (HAR) file information generated by a web client entity in a test environment;
   utilizing at least a portion of the HAR file information to generate one or more HTTP transaction test definitions;
   utilizing the one or more HTTP transaction test definitions to generate an associated web application server emulation used for performing a test on a system under test (SUT);
   executing the web application server emulation to generate a plurality of test packets; and
   generating associated performance metric data representative of the SUT in response to the SUT processing the plurality of test packets.

16. The non-transitory computer readable medium of claim 15 wherein the SUT includes a device under test (DUT).

17. The non-transitory computer readable medium of claim 15 wherein the web client entity generates the HAR file information in response to an HTTP based transaction conducted with one or more web service production servers.

18. The non-transitory computer readable medium of claim 15 comprising analyzing the HAR file information, identifying one or more entropy insertion points in the HAR file information, and inserting random parameter values at the identified one or more entropy insertion points to produce entropy enriched HAR file information.

19. The non-transitory computer readable medium of claim 18 wherein the entropy enriched HAR file information is used to generate the one or more HTTP transaction test definitions for generating synthetic test traffic that is similar to HTTP traffic represented in the HAR file information.

20. The non-transitory computer readable medium of claim 15 further comprising an automated web client exerciser engine configured to automatically exercise the web client entity.

* * * * *